United States Patent
Matsunami et al.

(10) Patent No.: US 9,868,324 B2
(45) Date of Patent: Jan. 16, 2018

(54) MOTORCYCLE TIRE

(71) Applicant: Sumitomo Rubber Industries, Ltd., Kobe-shi, Hyogo (JP)

(72) Inventors: Toshiyuki Matsunami, Kobe (JP); Yumiko Yosida, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 845 days.

(21) Appl. No.: 14/107,594

(22) Filed: Dec. 16, 2013

(65) Prior Publication Data
US 2014/0190607 A1    Jul. 10, 2014

(30) Foreign Application Priority Data

Jan. 7, 2013    (JP) ................................. 2013-000678

(51) Int. Cl.
*B60C 11/03*    (2006.01)
*B60C 11/117*    (2006.01)
(Continued)

(52) U.S. Cl.
CPC ........ *B60C 11/032* (2013.01); *B60C 11/0302* (2013.01); *B60C 11/1369* (2013.01);
(Continued)

(58) Field of Classification Search
CPC ............... B60C 11/032; B60C 11/1369; B60C 11/0316; B60C 2011/0313; B60C 2011/0381
(Continued)

(56) References Cited

U.S. PATENT DOCUMENTS 6,276,415 B1 *    8/2001    Nakamura ................ B60C 9/22
                                                             152/209.11
2012/0180919 A1 *    7/2012    Larregain ............... B60C 11/00
                                                             152/209.18

FOREIGN PATENT DOCUMENTS

GB    190826585 A    *    0/1909
GB    2114069 A    *    8/1983    ........... B60C 11/032
(Continued)

OTHER PUBLICATIONS

Machine Translation: JP 63116907 A; Kobayashi, Toshiaki; no date.*

(Continued)

*Primary Examiner* — Michael H Wilson
*Assistant Examiner* — Kendra Ly
(74) *Attorney, Agent, or Firm* — Birch, Stewart, Kolasch and Birch, LLP (57) ABSTRACT

A motorcycle tire comprises a tread portion provided on each side of the tire equator with primary oblique grooves extending from a tread center region to the vicinity of the tread edge, and secondary oblique grooves each having an axially outer end positioned axially inside the axially outer ends of the primary oblique grooves. The secondary oblique grooves comprises a pair of gradually widening parts respectively extending from two extreme ends of the secondary oblique groove in its longitudinal direction toward an intermediate position between the two extreme ends, while gradually increasing the groove width measured perpendicularly to the longitudinal direction, and a pair of gradually narrowing parts which are disposed between the gradually widening parts, and of which groove widths gradually decrease from the gradually widening parts toward the intermediate position.

18 Claims, 6 Drawing Sheets

(51) Int. Cl.
   *B60C 11/13* (2006.01)
   *B60C 11/12* (2006.01)
(52) U.S. Cl.
   CPC ............... *B60C 2011/0344* (2013.01); *B60C 2011/0355* (2013.01); *B60C 2011/0365* (2013.01); *B60C 2011/0367* (2013.01); *B60C 2011/0369* (2013.01); *B60C 2011/0374* (2013.01); *B60C 2011/0381* (2013.01); *B60C 2011/1231* (2013.01); *B60C 2200/10* (2013.01)
(58) Field of Classification Search
   USPC ............... D12/500–608; 152/209.17, 209.11
   See application file for complete search history.

(56) References Cited

FOREIGN PATENT DOCUMENTS

| | | | |
|---|---|---|---|
| JP | 63116907 A | * | 5/1988 |
| JP | 8-169211 A | | 7/1996 |
| JP | 2011-116258 A | | 6/2011 |
| TW | 372793 U1 | | 1/2010 |

OTHER PUBLICATIONS

Taiwan Office Action and Search Report, dated Dec. 30, 2015, for Taiwanese Application No. 102130455, with partial English Translation.
Extended European Search Report dated Apr. 22, 2014 for Application No. 14150065.2.

* cited by examiner

MOTORCYCLE TIRE

BACKGROUND OF THE INVENTION

The present invention relates to a motorcycle tire, more particularly to a tread pattern capable of improving wet performance and dry performance in good balance.

Unidirectional tread patterns comprising oblique grooves extending from the tread center region to the tread edges are widely employed in motorcycle tires.

A technique to increase the widths and volumes of the oblique grooves in order to improve grip on wet roads (wet performance) is well known in the tire art. If such technique is employed, however, the ground contacting area and the rigidity of the tread portion are decreased, and grip on dry roads (dry performance) tends to deteriorate.

SUMMARY OF THE INVENTION

It is therefore, an object of the present invention to provide a motorcycle tire in which the wet performance and dry performance can be improved in good balance.

According to the present invention, a motorcycle tire comprises a tread portion provided on each side of the tire equator with:
primary oblique grooves arranged circumferentially of the tire and extending axially outwardly from a tread center region to at least the vicinity of the tread edge; and
secondary oblique grooves each disposed between the circumferentially adjacent primary oblique grooves, and each having an axially outer end positioned axially inside the axially outer ends of the primary oblique grooves,
wherein
each of the secondary oblique grooves comprises:
a pair of gradually widening parts respectively extending from two extreme ends of the secondary oblique groove in its longitudinal direction toward an intermediate position between the two extreme ends, while gradually increasing the groove width measured perpendicularly to the longitudinal direction; and
a pair of gradually narrowing parts which are disposed between the gradually widening parts, and of which groove widths gradually decrease from the gradually widening parts toward the intermediate position.

The motorcycle tire according to the present invention may be provided with the following features (1)-(8):
(1) the resultant minimum width part between the gradually narrowing parts is provided with a shallow groove part whose groove depth is less than the groove depth of the gradually widening parts;
(2) the groove width of the minimum width part is 0.40 to 0.60 times the maximum groove width of the secondary oblique groove;
(3) the shallow groove part extends over the entire width of the minimum width part;
(4) the length of the shallow groove part measured in the longitudinal direction is not less than the groove width of the minimum width part;
(5) the depth of the shallow groove part is 20% to 60% of the depth of the gradually widening parts;
(6) a narrow groove is provided for each of the secondary oblique grooves to have one end connected to the minimum width part of the secondary oblique groove and the other end terminating within the tread portion;
(7) each of the secondary oblique groove has four arc-shaped groove edges which are two groove edges extending from one of the two extreme ends toward the intermediate position, and two groove edges extending from the other extreme end toward the intermediate position;
(8) all of the primary oblique grooves are inclined to an intended tire rotational direction toward the tire equator.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENTS

Embodiments of the present invention will now be described in detail in conjunction with the accompanying drawings.

Figure 2:
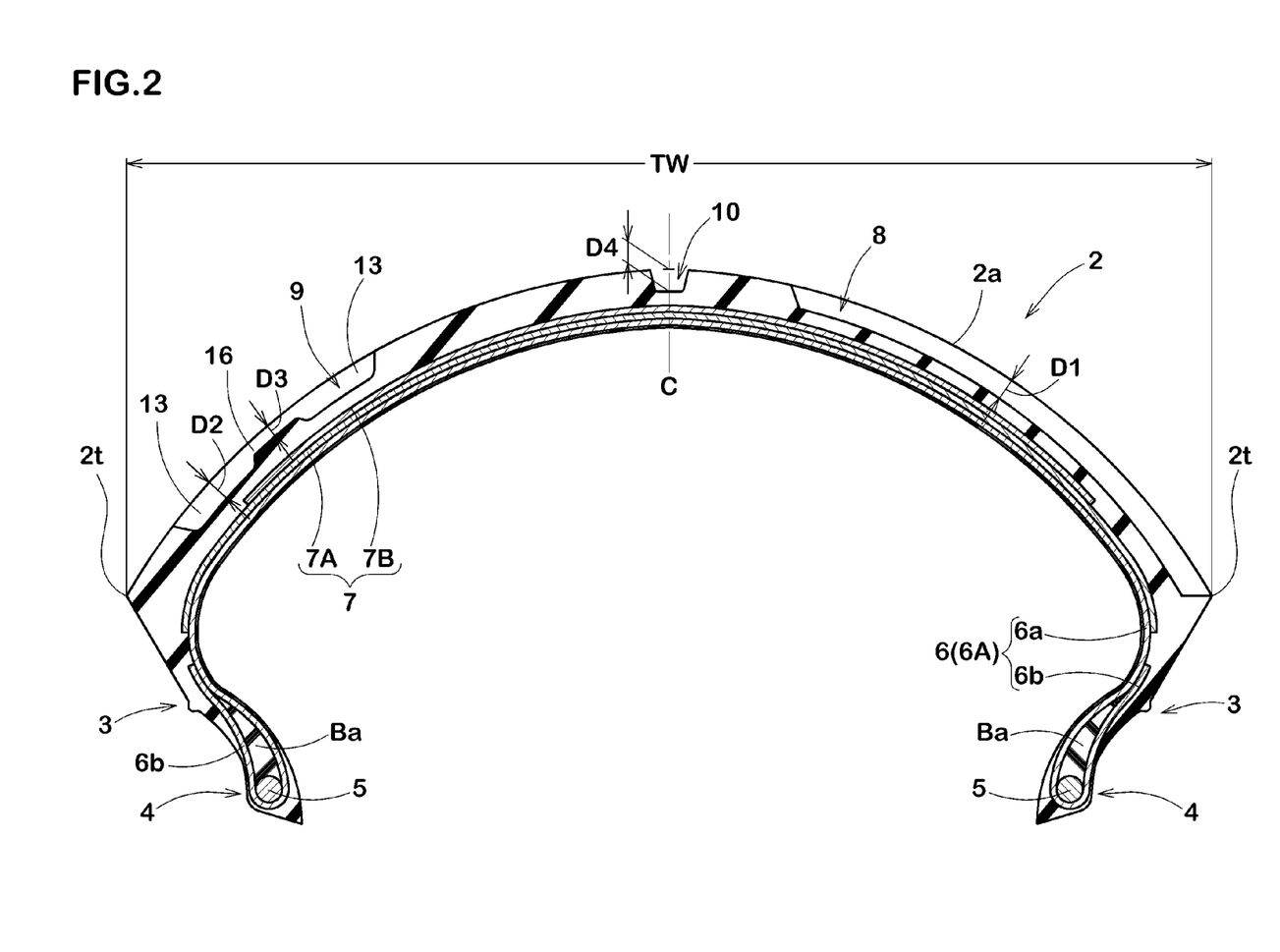
FIG. 2 is a cross sectional view of the motorcycle tire taken along line X-X of FIG. 1.

As shown in FIG. 2, the motorcycle tire as an embodiment of the present invention comprises a tread portion 2, a pair of axially spaced bead portions 4 each with a bead core 5 therein, a pair of sidewall portions 3 extending between the tread edges 2*t* and the bead portions 4, a carcass 6 extending between the bead portions 4, and a tread reinforcing belt 7 disposed radially outside the carcass in the tread portion.

As a characteristic of a motorcycle tire, the tread portion 2 is convexly curved so that the tread face between the tread edges 2*t* is curved like an arc swelling radially outwardly, and the maximum cross sectional width of the tire 1 occurs between the tread edges 2*t*, namely, equals to the axial tread width TW.

The carcass 6 is composed of a single ply 6A of cords extending between the bead portions 4 through the tread portion 2 and the sidewall portions 3, and turned up around the bead core 5 in each bead portion 4 to form a pair of turned up portions 6b and a main portion 6a therebetween. The carcass cords are arranged radially at an angle of from 75 to 90 degrees, preferably 80 to 90 degrees with respect to the tire equator C. For the carcass cords, organic fiber cords, for example, nylon, polyester, rayon and the like, can be used.

Between each turned up portion 6b and the main portion 6a of the carcass ply 6A, a bead apex Ba made of hard rubber is disposed.

The tread reinforcing belt 7 is composed of at least one ply (in this example, two cross plies 7A and 7B) of cords laid at an angle of from 5 to 40 degrees with respect to the tire equator C. For the belt cords, steel cords and high modulus organic cords for example aramid, rayon and the like can be used.

Figure 1:
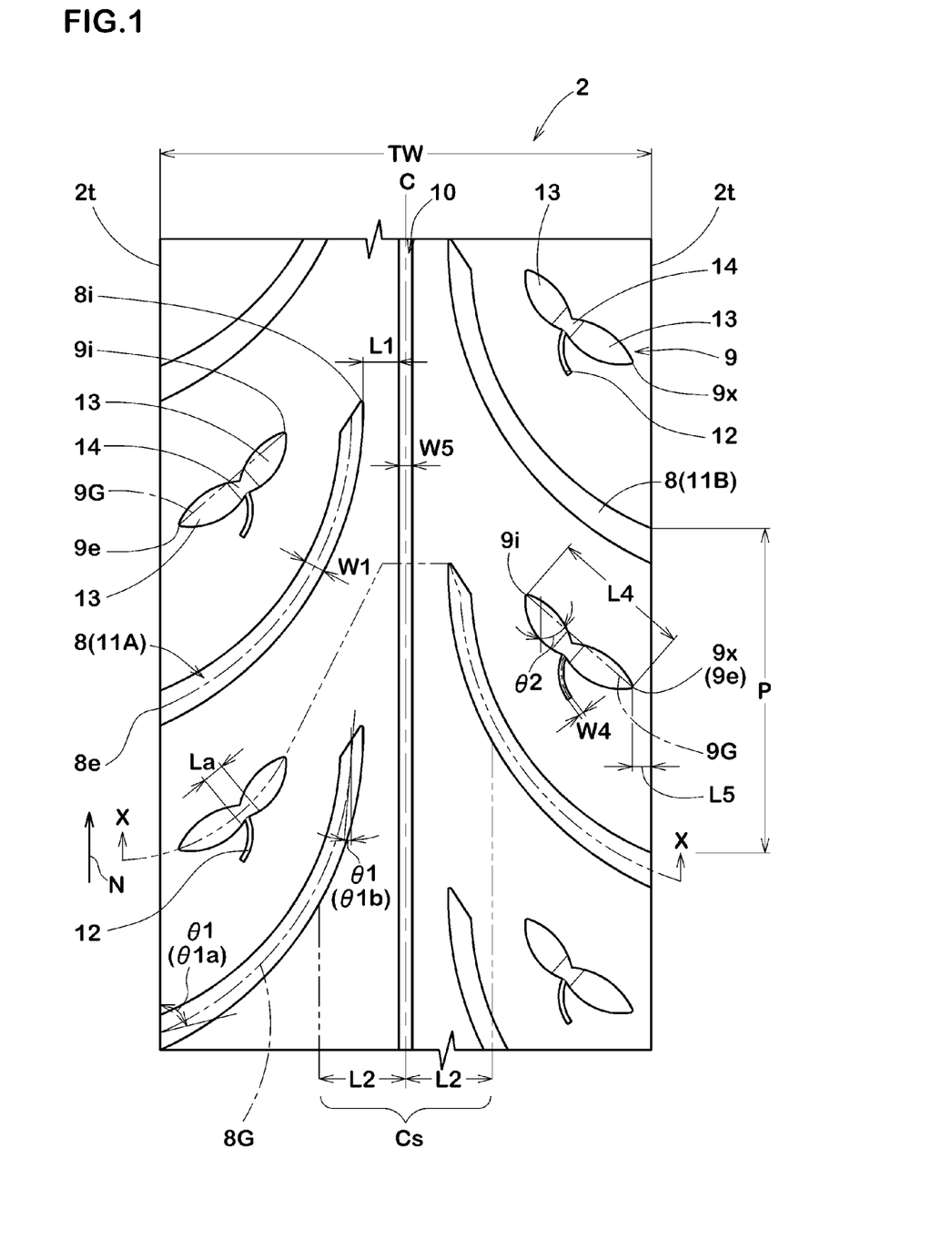
FIG. 1 is a developed partial view of the tread portion of a motorcycle tire as an embodiment of the present invention.

In this embodiment, as shown in FIG. 1, the motorcycle tire is provided in the tread portion 2 with a single center main groove 10 extending continuously in the tire circumferential direction along the tire equator C, primary oblique grooves 8 disposed on each side of the tire equator C and inclined with respect to the tire circumferential direction, and secondary oblique grooves 9 disposed on each side of the tire equator C and each disposed between the circumferentially adjacent primary oblique grooves 8.

On each side of the tire equator C, the primary oblique grooves 8 extend from the vicinity of the tire equator C to at least the vicinity of the tread edge 2t in order to provide good drainage during cornering.

The primary oblique grooves 11A on one side (left side in FIG. 1) of the tire equator C and
the primary oblique grooves 11B on the other side (right side in FIG. 1) of the tire equator C
are all inclined to the intended tire rotational direction N toward the axially inside or toward the tire equator C in order that water in the primary oblique grooves 11 (11A, 11B) is led toward the axially outside by utilizing the rotation of the tire.

In this embodiment, the axially outer ends 8e of the primary oblique grooves 8 are positioned at the tread edges 2t and opened toward the axially outside.

The axial inner ends 8i of the primary oblique grooves 8 are positioned at a certain axial distance L1 from the tire equator C.

The axial distance L1 is preferably set in a range of 5 to 13% of the tread width TW in order to maintain the rigidity of the tread center portion while securing effectual drainage from the tread center region to improve wet performance.

Further, the axial inner end portion of the primary oblique groove 8 is tapered toward the end 8i.

The angle θ1 of each of the primary oblique grooves 8 with respect to the tire circumferential direction is gradually increased from the axially inside to the axially outside of the tire in order that the drainage utilizing the tire rotation can be expedited from straight running position to cornering position. The angle θ1a of the primary oblique groove 8 measured at the tread edge 2t is preferably set in a range of from 60 to 80 degrees. The angle θ1b of the primary oblique groove 8 measured in the center region Cs is preferably set in a range of from 0 to 30 degrees. In this embodiment, the angle θ1 is substantially 0 degree at the axially inner end 8i.

Here, the angle θ1 (θ1a, θ1b) of the primary oblique groove 8 is that of the widthwise center line 8G of the primary oblique groove 8.

The center region Cs is defined as extending from the tire equator C toward each side thereof by an axial distance L2 of 15% of the tread width TW.

In order to improve the wet performance and dry performance in good balance, the depth D1 of the primary oblique grooves 8 is preferably set in a range of from 3.0 to 7.0 mm, the width W1 of the primary oblique grooves 8 is preferably set in a range of from 3.0 to 9.0 mm, excepting the tapered end 81, and preferably gradually increased toward the axially outer end, and
the circumferential pitches P of the primary oblique grooves 8 are preferably set in a range of from 40% to 90% of the tread width TW.

The secondary oblique grooves 9 are inclined with respect to the tire circumferential direction.

The axially outer ends 9x of the secondary oblique grooves 9 terminate at axial positions axially inside the axially outer ends 8e of the primary oblique grooves 8 in order to maintain the rigidity and the ground contacting area in the tread edge portions and improve the wet performance and the dry performance in good balance.

Figure 3:
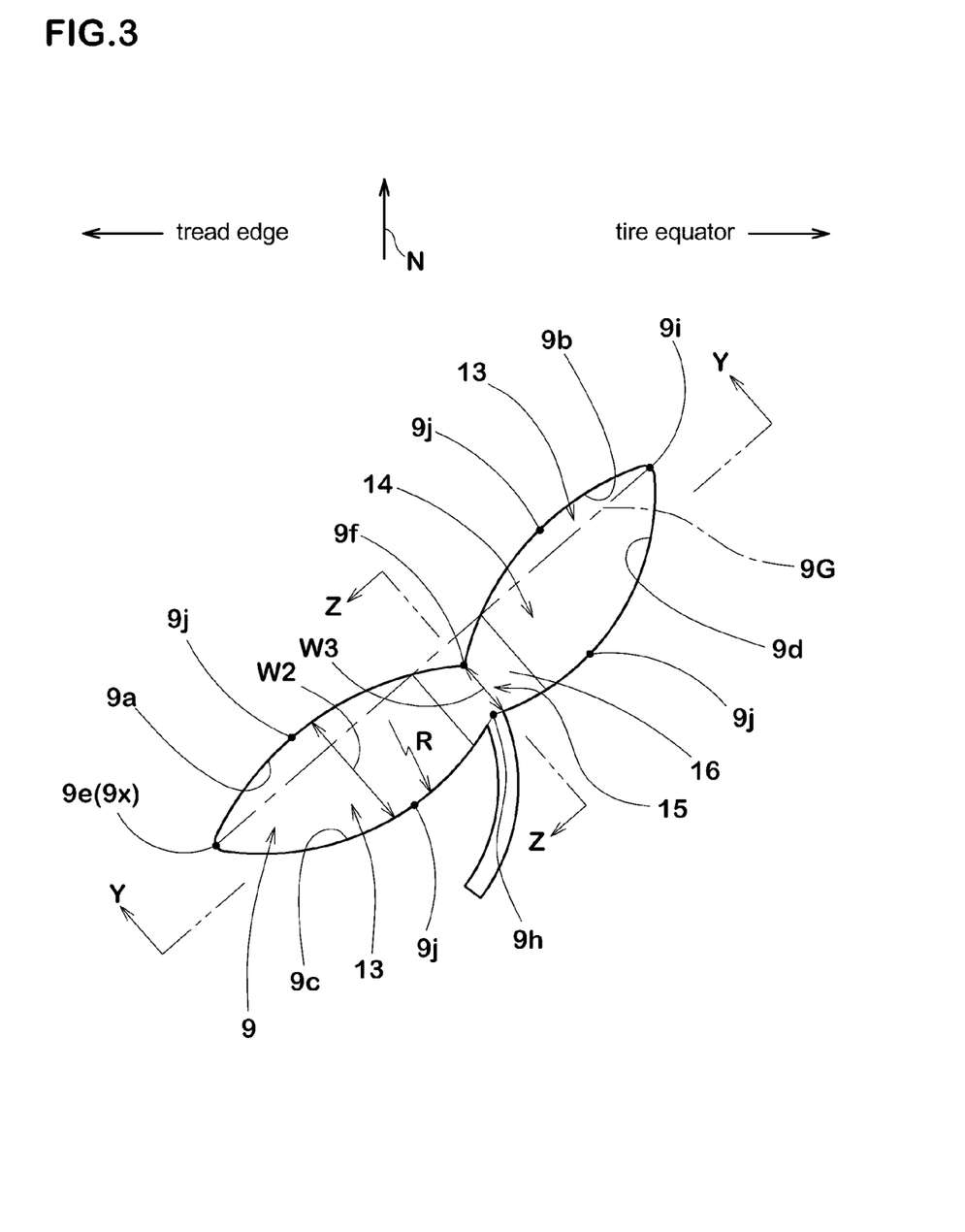
FIG. 3 is a top view of the secondary oblique groove thereof.

As shown in FIG. 3, the secondary oblique groove 9 has extreme ends 9e and 9i in its longitudinal direction, one end 9i is on the tire equator C side, and the other end 9e is on the tread edge 2t side which is, in this embodiment, equals to the above-mentioned outer end 9x in the tire axial direction. The longitudinal direction is the direction of the straight line drawn between two farthest points (9e, 9i) on the secondary oblique groove 9.

The secondary oblique grooves 9 comprises a pair of gradually widening parts 13 which extend from the respective ends 9e and 9i toward the midpoint in the longitudinal direction, while gradually increasing the groove width measured perpendicularly to the longitudinal direction, and a pair of gradually narrowing parts 14 which extend from the respective gradually widening parts 13 toward the midpoint in the longitudinal direction, while gradually decreasing the groove width.

Therefore, between the gradually narrowing parts 14, a minimum width part 15 having a minimum groove width is formed.

Such secondary oblique grooves 9 help to secure high rigidity of the tread portion 2 and a wide ground contacting area. The gradually widening parts 13 and gradually narrowing parts 14 provide edge components in various directions, and the edge effect (scratching effect) on wet roads is increased. Therefore, the secondary oblique grooves 9 help to improve the dry performance and wet performance in good balance.

Figure 4:
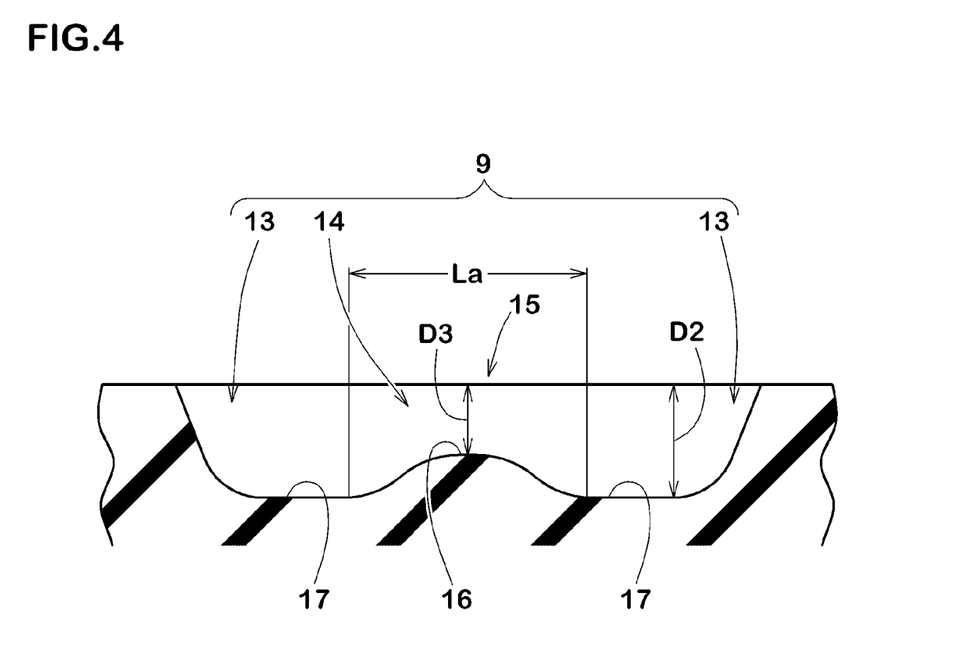
FIG. 4 is a cross sectional view of the secondary oblique groove taken along line Y-Y of FIG. 3.

The minimum width part 15 is, as shown in FIG. 4, provided with a shallow groove part 16 of which groove depth D3 is less than the groove depth D2 of the gradually widening part 13.

Thus, in addition to the shallow groove part 16, the secondary oblique grooves 9 has a deep groove part 17 which is formed on each side of the shallow groove part 16 in the longitudinal direction and of which groove depth D2 is more than the groove depth D3 of the shallow groove part 16.

During running, stress is liable to concentrate in the minimum width part 15 and there is a possibility that the groove bottom cracks. But, by providing the shallow groove part 16 in this part, the occurrence of such crack can be prevented.

Figure 5:
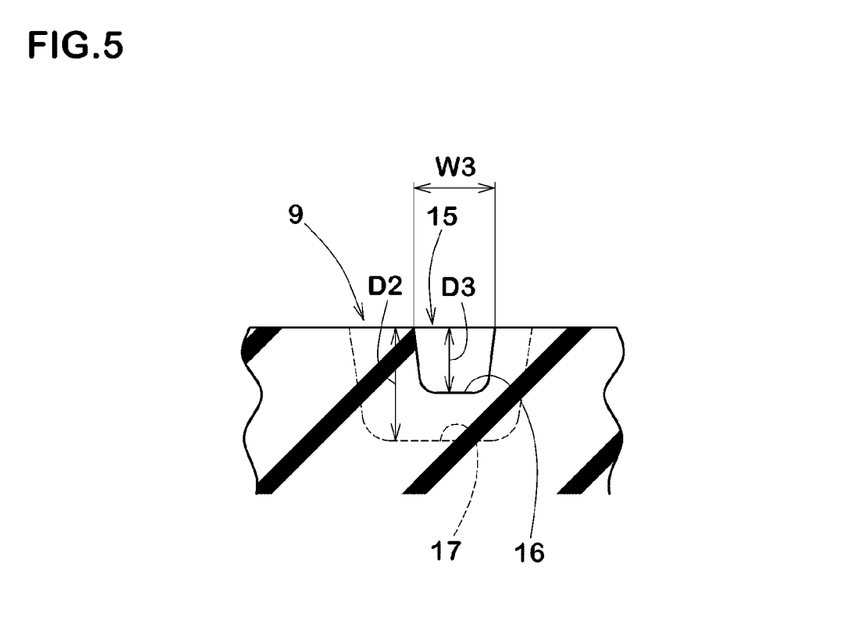
FIG. 5 is a cross sectional view of the shallow groove part of the secondary oblique groove taken along line Z-Z of FIG. 3.
Figure 6:
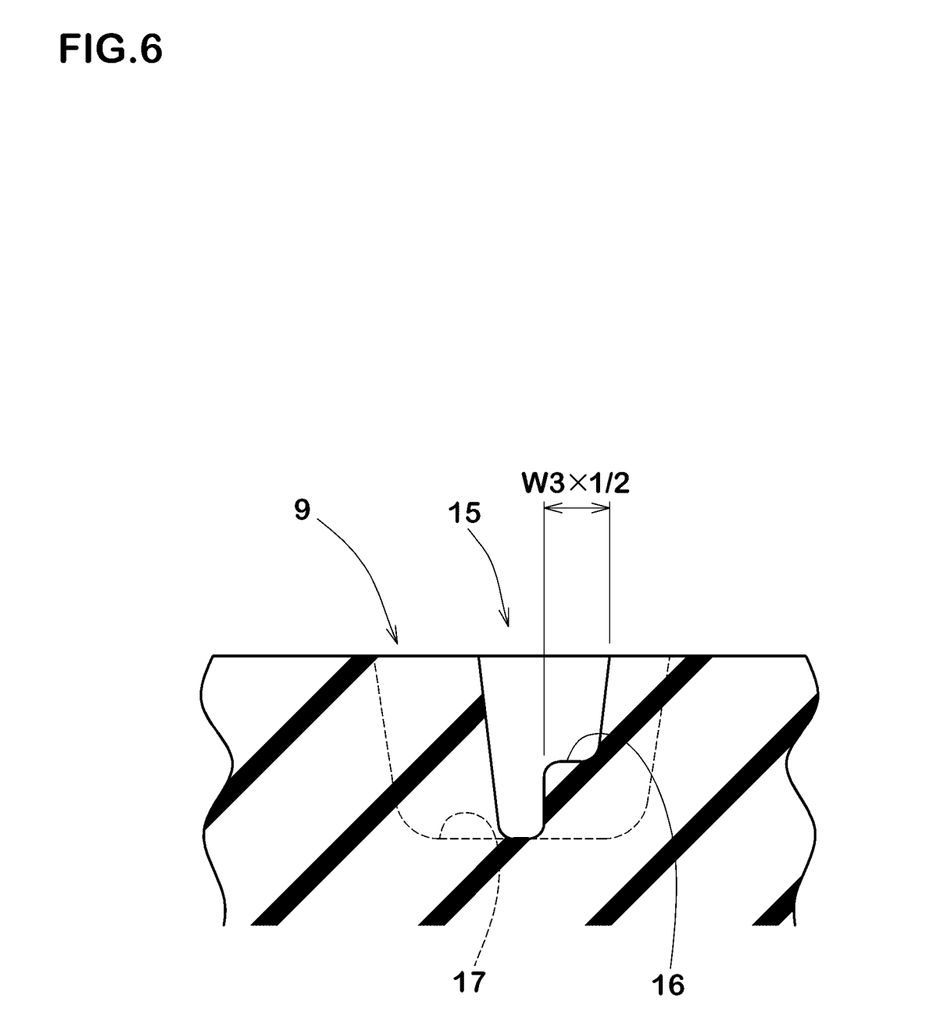
FIG. 6 is a cross sectional view of another example of the shallow groove part.
Figure 7:
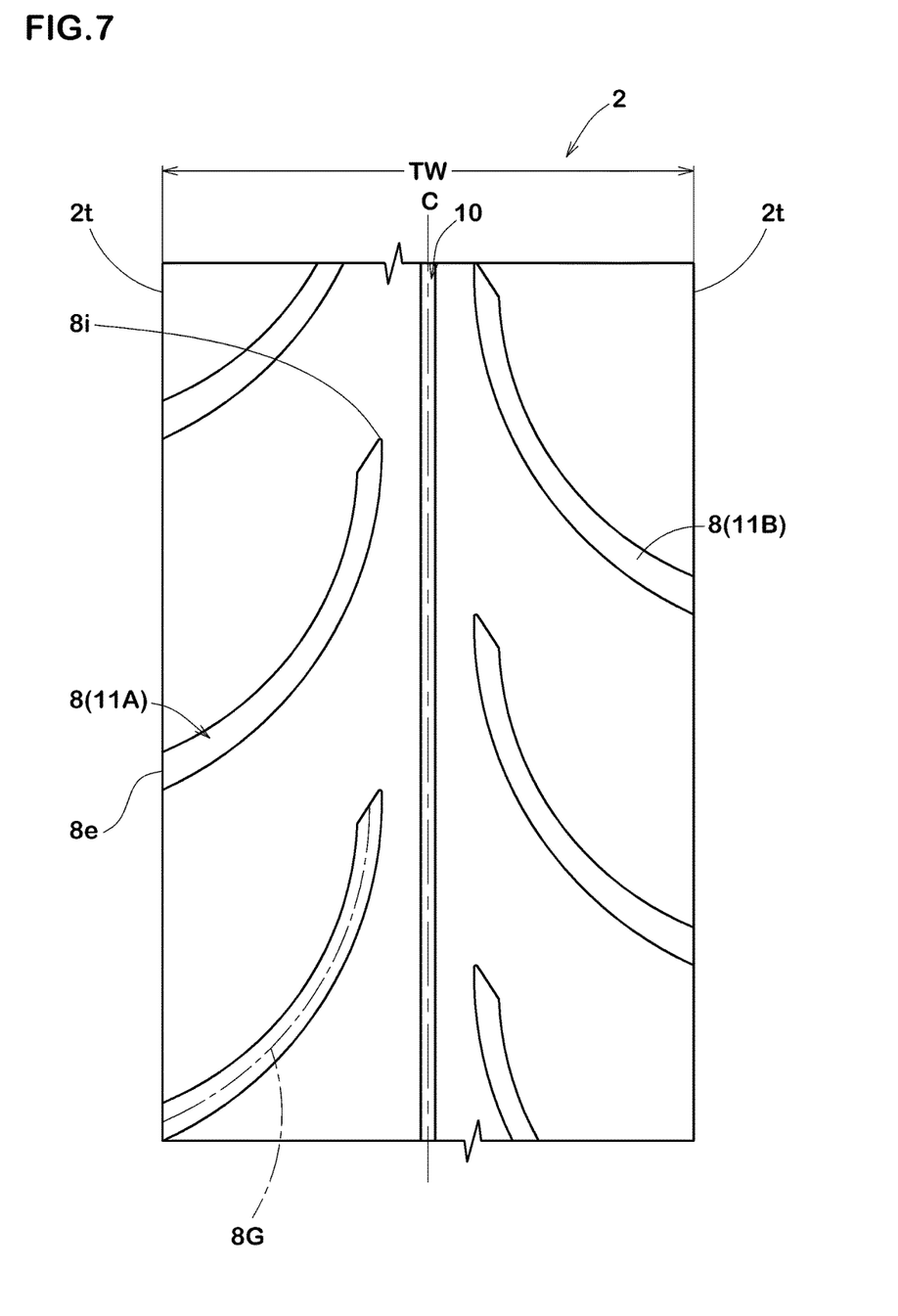
FIG. 7 is a developed partial view of the tread portion of a comparative example tire used in the undermentioned comparison tests.

Thus, preferably, the entire width of the minimum width part 15 is formed as the shallow groove part 16 as shown in FIG. 5.

The groove depth D3 of the shallow groove part 16 is set in a range of not less than 20%, more preferably not less than 40%, but not more than 60%, more preferably not more than 55% of the groove depth D2 (maximum groove depth) of the gradually widening part 13.

If more than 60%, it becomes difficult to effectively prevent the occurrence of cracks. If less than 20%, the resistance of water flow between the gradually narrowing parts 14 increases and there is a possibility that wet performance is deteriorated.

Further, it is preferable that, as shown in FIG. 4, the length La of the shallow groove part 16 in its longitudinal direction is not less than the groove width W3 of the minimum width part 15.

If the length La is less than the width W3, the strength of the groove bottom of the minimum width part 15 can not be increased, and there is a possibility that cracks occur at the groove bottom. If the length La is excessively larger than the width W3, the resistance of water flow increases and there is a possibility that wet performance is deteriorated.

More preferably, the length La of the shallow groove part 16 is not less than 1.5 times, but not more than 6 times, more preferably not more than 5 times the groove width W3 of the minimum width part 15.

The groove width W3 of the minimum width part 15 is preferably set in a range of not less than 0.40 times, more preferably not less than 0.45 times, but not more than 0.60 times, more preferably not more than 0.55 times the maximum groove width W2 of the secondary oblique groove 9.

If less than 0.40 times, cracks are liable to occur in the minimum width part 15. If more than 0.60 times, the groove edge effect (scratching effect) on wet roads decreases.

As shown in FIG. 3, the secondary oblique groove 9 has four groove edges 9a, 9b, 9c and 9d extending from the above-mentioned two extreme ends 9e and 9i in its longitudinal direction.

The first groove edge 9a extending from one end 9e and the second groove edge 9b extending from the other end 9i are connected to each other at the minimum width part 15 on one side in the tire circumferential direction (upper side in FIG. 3). The third groove edge 9c extending from one end 9e and the fourth groove edge 9d extending from the other end 9i are connected to each other at the minimum width part 15 on the other side in the tire circumferential direction (lower side in FIG. 3).

Each of the groove edges 9a, 9b, 9c and 9d is arc-shaped as shown in FIG. 3, swelling toward the outside of the groove, in order to provide edge components in various directions and improve wet performance during cornering.

The first groove edge 9a and the second groove edge 9b form a point 9f protruding toward the tire equator side at their junction point.

The third groove edge 9c and fourth groove edge 9d form a point 9h protruding toward the tread edge 2t side at their junction point.

The groove edges 9a and 9c constitute the edges of the gradually widening part 13 and the gradually narrowing part 14, and the groove edges 9b and 9d constitute the edges of the gradually widening part 13 and the gradually narrowing part 14 on another side, thereby the rigidity of the tread portion 2 near the groove edges 9a-9d is secured in good balance and the dry performance and wet performance can be further improved.

In this embodiment, as shown in FIG. 1, the widthwise center line of the secondary oblique groove 9 is curved toward the axially inside and toward the opposite direction to the intended tire rotational direction N, passing through on the tire equator side of a longitudinal line 9G drawn straight between the two extreme ends 9e and 9i of the secondary oblique groove 9.

Preferably, the radius R of curvature of each or the groove edges 9a-9d is set in a range of from 10% to 30% of the tread width TW.

If more than 30%, it becomes difficult to enjoy the benefit of the edge effect in various directions. If less than 10%, the secondary oblique groove 9 becomes small, and it becomes difficult to improve the wet performance.

In this embodiment, each of the groove edges 9a-9d is a circular arc. If not a circular arc, the radius R of curvature is defined by a circle passing through three points which are both ends of the groove edge concerned and a point on the groove edge farthest from the longitudinal line 9G drawn straight between the two extreme ends 9e and 9i of the secondary oblique groove 9. For example, in the case of the first groove edge 9a, the three points are the end 9e, the protruding point 9f, and the farthest point 9j.

In order to secure the rigidity of the tread portion 2 and a good drainage, it is preferred that the angle $\theta 2$ of the longitudinal line 9G with respect to the tire circumferential direction is set in a range of from 30 to 65 degrees, the length L4 of the secondary oblique groove 9 in its longitudinal direction is set in a range of from 15% to 45% of the tread width TW, the axial distance L5 between the axially outer end 9x of the secondary oblique grooves 9 and the tread edge 2t is set in a range of from 2% to 6% of the tread width TW, and the maximum groove width W2 of the secondary oblique groove 9 is set in a range of from 5.0 to 9.0 mm.

In this embodiment, further, a narrow groove 12 is provided for each of the secondary oblique grooves 9. One end 12b of the narrow groove 12 terminates within the tread portion 2 without connected to any groove, but the other end 12a of the narrow groove 12 is connected to the minimum width part 15 in order to expedite drainage from the minimum width part 15.

The width W4 of the narrow groove 12 is preferably set in a range of from 0.7 to 2.0 mm, and the depth of the narrow groove 12 is preferably set in a range of from 0.5 to 1.5 mm in order to improve the wet performance while maintaining the dry performance by securing the rigidity of the tread portion 2.

The narrow groove 12 in this embodiment is arc-shaped in order to provide edge components in various directions and improve wet performance during cornering.

The narrow groove 12 extends from the tire equator side of the secondary oblique groove 9 toward the opposite direction to the intended tire rotational direction N, slightly curving toward the tread edge side.

In this embodiment, therefore, the combination of one secondary oblique groove 9 and one narrow groove 12 looks like two leaves at one end of a small shaft.

The center main groove 10 may be formed as a nonlinear groove such as zigzag groove and wavy groove (e.g. sine-wave). In this embodiment, however, the center main groove 10 is formed as a straight groove extending straight in parallel with the tire circumferential direction and having a constant width W5. In order to provide necessary drainage for the tread center region, and at the same time, not to impair the rigidity in the tread center region, it is preferred that the width W5 is set in a range of from 2.0 to 5.0 mm and the depth D4 is set in a range of from 4.0 to 6.0 mm.

Comparison Tests

Based on the tread pattern shown in FIG. 1, motorcycle tires of size 90/90-1050J (rim: MT2.15×10) having specifications shown in Table 1 were prepared and tested.

Common specifications are as follows:
tread width TW: 91 mm
primary oblique grooves' depth: 5.5 mm
shallow groove part's depth: 2.7 mm
gradually widening parts' depth: 5.2 mm
center main groove's depth: 5.5 mm
narrow grooves' depth: 1.0 mm <Wet Performance and Dry Performance Test>

Test tires were installed on the two wheels of a 50 cc motorcycle. (tire pressure: front 125 kPa, rear 200 kPa) The motorcycle was run on a dry asphalt road and a wet asphalt road covered with 0.5 to 2.0 mm depth water prepared in a tire test course, and characteristics relating to the road grip at starting, acceleration, cornering and braking were evaluated by the test rider into five ranks.

The results are shown in Table 1, wherein the higher rank number is better.

<Durability (Crack) Test>

The test was conducted according to the durability (ENDURANCE) test specified in Federal Motor vehicle Safety Standards No. 119, New pneumatic tires for vehicles other than passenger cars. The test tire was run on a 1.7 m dia. tire test drum (speed 80 km/h, ambient temperature 38+−3 deg. C.), while gradually increasing the tire load as follows.

The secondary oblique grooves were visually checked for cracks at the groove bottom after each step.

Tire Load:
1st step: 1.87 kN (testing time 4 hours)
2nd step: 2.02 kN (testing time 6 hours)
3rd step: 2.18 kN (testing time 24 hours)
4th step: 2.18 kN (testing time 72 hours)

The results are shown in Table 1, wherein
"ok" means that no crack was found after the step.
"rj" means that crack was found after the step From the test results, it could be confirmed that, in comparison with the comparative tires Ref. 1-Ref. 5, the performances of embodiment tires were improved in good balance.

The invention claimed is:

1. A motorcycle tire comprising a tread portion provided on each side of the tire equator with:
primary oblique grooves arranged circumferentially of the tire and extending axially outwardly from a tread center region to at least the vicinity of the tread edge; and
secondary oblique grooves each disposed between the circumferentially adjacent primary oblique grooves, and each having an axially outer end positioned axially inside the axially outer ends of the primary oblique grooves,
wherein each of the secondary oblique grooves comprises:
a pair of gradually widening parts respectively extending from two pointed extreme ends of the secondary oblique groove in its longitudinal direction toward an intermediate position between the two extreme ends, while gradually increasing the groove width measured perpendicularly to the longitudinal direction; and
a pair of gradually narrowing parts which respectively extend from the gradually widening parts to the intermediate position, the groove widths of which gradually decrease from the gradually widening parts to the intermediate position, wherein
each of the secondary oblique grooves has a pair of opposite groove edges, each groove edge being made up of a first part and a second part, wherein the first part is an arc being convex toward the outside of the secondary oblique groove and extending from one of said pointed two extreme ends to said intermediate position and wherein the second part is an arc being convex toward the outside of the secondary oblique groove and extending from the other of said pointed two extreme ends to said intermediate position.

2. The motorcycle tire according to claim 1, wherein the resultant minimum width part between the gradually narrowing parts is provided with a shallow groove part whose groove depth is less than the groove depth of the gradually widening parts.

3. The motorcycle tire according to claim 2, wherein the groove width of the minimum width part is 0.40 to 0.60 times the maximum groove width of the secondary oblique groove.

TABLE 1

| Tire | Ref. 1 | Ref. 2 | Ref. 3 | Ref. 4 | Ref. 5 | Ex. 1 | Ex. 2 | Ex. 3 | Ex. 4 |
|---|---|---|---|---|---|---|---|---|---|
| tread pattern (FIG. No.) | 1 | 7 | 1 | 1 | 1 | 1 | 1 | 1 | 1 |
| max. width W2 (mm) | 7.0 | — | 8.4 | 3.2 | 1.4 | 7.0 | 7.0 | 7.0 | 7.0 |
| min. width part W3/W2 | 1.0 | — | 1.0 | 1.0 | 1.0 | 0.46 | 0.20 | 0.35 | 0.40 |
| shallow groove part (FIG. No.)*1 | NA | — | NA | NA | NA | 5 | 5 | 5 | 5 |
| length La/W3 | — | — | — | — | — | 4.2 | 4.2 | 4.2 | 4.2 |
| dry performance | 3.0 | 5.0 | 2.5 | 3.5 | 4.0 | 3.3 | 3.8 | 3.5 | 3.4 |
| wet performance | 3.0 | 1.0 | 3.5 | 2.5 | 2.0 | 3.5 | 3.8 | 3.6 | 3.5 |
| dry + wet performance | 6.0 | 6.0 | 6.0 | 6.0 | 6.0 | 6.8 | 7.6 | 7.1 | 6.9 |
| durability   3rd step | ok | ok | ok | ok | rj | ok | ok | ok | ok |
|             4th step | ok | ok | ok | rj | — | ok | rj | rj | ok |

| Tire | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|
| tread pattern (FIG. No.) | 1 | 1 | 1 | 1 | 1 | 1 | 1 | 1 | 1 |
| max. width W2 (mm) | 7.0 | 7.0 | 7.0 | 7.0 | 7.0 | 7.0 | 7.0 | 7.0 | 7.0 |
| min. width part W3/W2 | 0.60 | 0.65 | 0.90 | 0.46 | 0.46 | 0.90 | 0.46 | 0.46 | 0.46 |
| shallow groove part (FIG. No.)*1 | 5 | 5 | 5 | 5 | NA | 5 | 5 | 5 | 5 |
| length La/W3 | 4.2 | 4.2 | 4.2 | 4.2 | — | 0.8 | 1.0 | 6.0 | 7.0 |
| dry performance | 3.2 | 3.1 | 3.2 | 3.3 | 3.3 | 3.3 | 3.2 | 3.3 | 3.3 |
| wet performance | 3.4 | 3.3 | 3.2 | 3.5 | 3.5 | 3.5 | 3.6 | 3.2 | 3.0 |
| dry + wet performance | 6.6 | 6.4 | 6.4 | 6.8 | 6.8 | 6.8 | 6.8 | 6.5 | 6.3 |
| durability   3rd step | ok | ok | ok | rj | rj | ok | ok | ok | ok |
|             4th step | ok | ok | ok | — | — | rj | ok | ok | ok |

*1"NA" means that the shallow groove part could not be formed.

4. The motorcycle tire according to claim 3, wherein the shallow groove part extends over the entire width of the minimum width part.

5. The motorcycle tire according to claim 3, wherein the length of the shallow groove part measured in the longitudinal direction is not less than the groove width of the minimum width part.

6. The motorcycle tire according to claim 3, wherein the depth of the shallow groove part is 20% to 60% of the depth of the gradually widening parts.

7. The motorcycle tire according to claim 3, wherein a narrow groove is provided for each of the secondary oblique grooves to have one end connected to the minimum width part of the secondary oblique groove and the other end terminating within the tread portion.

8. The motorcycle tire according to claim 2, wherein the shallow groove part extends over the entire width of the minimum width part.

9. The motorcycle tire according to claim 8, wherein the length of the shallow groove part measured in the longitudinal direction is not less than the groove width of the minimum width part.

10. The motorcycle tire according to claim 8, wherein the depth of the shallow groove part is 20% to 60% of the depth of the gradually widening parts.

11. The motorcycle tire according to claim 8, wherein a narrow groove is provided for each of the secondary oblique grooves to have one end connected to the minimum width part of the secondary oblique groove and the other end terminating within the tread portion.

12. The motorcycle tire according to claim 2, wherein the length of the shallow groove part measured in the longitudinal direction is not less than the groove width of the minimum width part.

13. The motorcycle tire according to claim 12, wherein the depth of the shallow groove part is 20% to 60% of the depth of the gradually widening parts.

14. The motorcycle tire according to claim 12, wherein a narrow groove is provided for each of the secondary oblique grooves to have one end connected to the minimum width part of the secondary oblique groove and the other end terminating within the tread portion.

15. The motorcycle tire according to claim 2, wherein the depth of the shallow groove part is 20% to 60% of the depth of the gradually widening parts.

16. The motorcycle tire according to claim 15, wherein a narrow groove is provided for each of the secondary oblique grooves to have one end connected to the minimum width part of the secondary oblique groove and the other end terminating within the tread portion.

17. The motorcycle tire according to claim 2, wherein a narrow groove is provided for each of the secondary oblique grooves to have one end connected to the minimum width part of the secondary oblique groove and the other end terminating within the tread portion.

18. The motorcycle tire according to claim 1, wherein all of the primary oblique grooves are inclined to an intended tire rotational direction toward the tire equator.

\* \* \* \* \*